United States Patent
Meurer

(10) Patent No.: US 12,515,888 B2
(45) Date of Patent: Jan. 6, 2026

(54) SORTING SYSTEM AND METHOD FOR OPERATING SAME

(71) Applicant: Dematic GmbH, Heusenstamm (DE)

(72) Inventor: Hans Christoph Meurer, Framersheim (DE)

(73) Assignee: Dematic GmbH, Heusenstamm (DE)

(*) Notice: Subject to any disclaimer, the term of this patent is extended or adjusted under 35 U.S.C. 154(b) by 85 days.

(21) Appl. No.: 18/564,266

(22) PCT Filed: May 18, 2022

(86) PCT No.: PCT/EP2022/063431
§ 371 (c)(1),
(2) Date: Nov. 27, 2023

(87) PCT Pub. No.: WO2022/248306
PCT Pub. Date: Dec. 1, 2022

(65) Prior Publication Data
US 2024/0239613 A1    Jul. 18, 2024

(30) Foreign Application Priority Data
May 28, 2021 (DE) .................. 10 2021 113 886.8

(51) Int. Cl.
*B65G 43/08* (2006.01)
*B07C 1/02* (2006.01)
(Continued)

(52) U.S. Cl.
CPC .............. *B65G 43/08* (2013.01); *B07C 1/02* (2013.01); *B07C 3/08* (2013.01); *B65G 47/04* (2013.01);
(Continued)

(58) Field of Classification Search
CPC ........ B65G 47/31; B65G 43/08; B65G 47/28; B65G 47/04; B07C 1/00; B07C 1/02; B07C 3/08
(Continued)

(56) References Cited

U.S. PATENT DOCUMENTS 4,678,073 A * 7/1987 Anderson ............ B65G 47/244
198/444
5,699,891 A    12/1997 Gosdowski et al.
(Continued)

FOREIGN PATENT DOCUMENTS

CA    2954270 A1    1/2016
CN    109661358 A    4/2019
(Continued)

OTHER PUBLICATIONS

Preliminary Report on Patentability of the International Searching Authority in English from corresponding Patent Cooperation Treaty (PCT) Application No. PCT/EP2022/063431, issued Nov. 21, 2023.
(Continued)

*Primary Examiner* — James R Bidwell
(74) *Attorney, Agent, or Firm* — Gardner, Linn, Burkhart & Ondersma LLP

(57) ABSTRACT

A sorting system, comprising a central controller, a sorting section with a variably controllable conveying speed, at least two supply sections leading to the feed into the sorting section, and a monitoring device in the feed, wherein the monitoring device is configured and connected to the central controller in such a manner that arriving articles are detected, and a stored speed for controlling the conveying speed of the sorting section is retrieved for the detected article by the central controller and used for controlling the conveying speed, and a corresponding control method.

14 Claims, 4 Drawing Sheets

(51) Int. Cl.
  *B07C 3/08* (2006.01)
  *B65G 47/04* (2006.01)
  *B65G 47/28* (2006.01)
  *B65G 47/31* (2006.01)

(52) U.S. Cl.
  CPC .............. *B65G 47/31* (2013.01); *B65G 47/28* (2013.01); *B65G 2811/095* (2013.01)

(58) Field of Classification Search
  USPC .................................. 198/459.8, 419.2, 444
  See application file for complete search history.

(56) References Cited

U.S. PATENT DOCUMENTS

| | | | |
|---|---|---|---|
| 7,562,761 B2 | 7/2009 | Tasma | |
| 7,756,603 B1 * | 7/2010 | Delaney, III | H01R 25/145 198/459.8 |
| 9,688,479 B1 * | 6/2017 | Gorski | B65G 47/682 |
| 2014/0364998 A1 | 12/2014 | Neiser et al. | |
| 2016/0221762 A1 * | 8/2016 | Schroader | B65G 47/31 |
| 2017/0312789 A1 | 11/2017 | Schroader | |
| 2018/0022558 A1 | 1/2018 | Kim et al. | |

FOREIGN PATENT DOCUMENTS

| | | | | |
|---|---|---|---|---|
| CN | 110434074 A | | 11/2019 | |
| CN | 212821179 U | | 3/2021 | |
| DE | 102006015689 B4 | | 10/2007 | |
| DE | 102008026326 A1 | | 12/2009 | |
| DE | 102009050901 A1 | | 4/2011 | |
| DE | 102015116785 A1 | | 4/2017 | |
| EP | 0484150 A1 | | 5/1992 | |
| EP | 2470459 B1 | | 7/2012 | |
| EP | 2591559 A1 | | 5/2013 | |
| EP | 3093825 A1 * | | 11/2016 | .............. B07C 1/00 |
| WO | 2014005895 A1 | | 1/2014 | |
| WO | 2016010766 A1 | | 1/2016 | |

OTHER PUBLICATIONS

Drive system Drive system et al: "Increasing the energy efficiency of continuous piece goods conveyors through optimized drive system selection", Dec. 31, 2019 pp. 1-222, XP055955368, retrieved from internet URL: https://diglib.tugraz.at/download.php?id=5cc6a9bb2f329&location=browse; original and English machine translation.

Jodin Dirk et al: "Sorting and distribution systems basics, construction, calculation and implementation", Dec. 31, 2012, pp. 1-19 XP055955404 ISBN: 978-3-642-31289-2, retrieved from internet URL: http://springer.com/978-3-642-31289-2; original and English machine translation.

International Search Report and Written Opinion of the International Searching Authority in English from corresponding Patent Cooperation Treaty (PCT) Application No. PCT/EP2022/063431, indicated completed on Aug. 29, 2022 and mailed on Sep. 23, 2022.

* cited by examiner

SORTING SYSTEM AND METHOD FOR OPERATING SAME

CROSS REFERENCE TO RELATED APPLICATION

The present application claims the priority benefits of International Patent Application No. PCT/EP2022/063431, filed May 18, 2022, and claims benefit of German patent application no. DE102021113886.8, filed on May 28, 2021.

BACKGROUND AND FIELD OF THE INVENTION

The invention relates to a sorting system and a method for operating the same.

Sorting systems are an essential component in distribution centres, warehouses or quite generally in internal logistics. Currently, they already permit high throughputs in spite of a broad spectrum of articles which are to be handled differently. In particular, so-called shoe sorters permit high-speed sorting of articles. In particular, they are suitable for relatively uniform, rectangular articles or cartons etc. because these do not tend to tip or fall over. However, the acceleration and deceleration forces which occur can still cause the required articles or objects to tip over.

Therefore, the sorters must manipulate the objects so slowly that the occurring acceleration forces do not cause the objects to fall over. However, this requires a reduction in throughput, in particular when a broad product spectrum of extremely varied objects is being handled because e.g. the article with the greatest tendency to fall over defines the minimum speed of handling all of the objects located at the same time on the same conveying section of the sorter.

Such shoe sorters are known e.g. from U.S. Pat. No. 7,562,761 B2 or EP 2 470 459 B1. WO 2016/010766 A1 describes the use of feeds and the activation thereof.

SUMMARY OF THE INVENTION

The object of the present invention is to provide a sorting system and a method for operating same that permits a higher throughput.

In accordance with aspects of the invention, it has been recognised that, if incoming articles are detected and with respect to the detected article a stored speed for controlling the conveying speed of the sorting section is interrogated by the central controller, it becomes possible to transport these articles in a targeted manner at a conveying speed suitable for them and therefore to optimise the throughput.

The suitable conveying speed on the sorting section is ascertained preferably on the basis of the article itself and is stored in a database of the central control system (WMS). This can take place, e.g. for each article with the same EAN code, on one occasion as part of a teach-in process. The respectively relevant product properties can also already be present in the database.

In particular, the tipping stability of an article at a corresponding speed is used as a measure of a possible conveying speed. The tipping stability also plays a role in determining and specifying possible acceleration values in order to reach the speed. The tipping angle at which an article tips over or the angle at which the tipping point is exceeded can be used as a benchmark for the tipping stability. The larger the tipping angle, the more stable the article. The tipping stability can also be ascertained empirically, e.g. on the installation itself or in a suitable testing apparatus which simulates the handling on a sorter (e.g. shoe sorter). The tipping stability can also be determined arithmetically on the basis of the known dimensions of the articles and centre of gravity indications.

In addition to the tipping stability, other article properties can also be used for controlling the conveying speed, such as fragility, surface quality, friction coefficients, integrity and stability of the package, i.e. the contents of the package can fall out or protrude, the package can be damaged, adhesive joints become loose, flaps stick out and the package can change shape. In a similar manner to above, these properties can also be ascertained empirically on the installation itself or in a suitable testing apparatus which simulates the handling on a shoe sorter.

Articles which have a very similar or the same maximum conveying speed, which results from the article properties, are thus introduced in a grouped manner onto the sorting section. For this purpose, conveying speed groups, into which each article is classified, are stored in the central controller or database.

Therefore, it has e.g. been recognized that the objects which tend to fall over account for a few percent of the total inventory (e.g. only 1 to 2%) which is conveyed daily via a sorting section and so, when these objects which tend e.g. to fall over are handled in groups together, it is possible to reduce the speed of the sorting section of the sorting system only during this handling and otherwise to operate at a higher speed. This makes it possible to achieve significant increases in speed.

The terms "articles" and "objects" include e.g. individual articles, containers, etc. Preferably, the sorting section has a plurality of sorting portions which can be controlled independently of one another in terms of conveying speed. This allows the conveying speed for each portion to be regulated in a customised manner for a respective group and not to be changed until all articles from a previous or subsequent group with a different conveying speed specification have passed through the entire sorting section.

If the feed sections are connected to a replenishment storage, from which the feed sections are supplied in groups with articles of the same or similar conveying speed, grouping can be effected even when articles are provided, i.e. at an early point in time.

Embodiments of the invention also relate to a corresponding method for operating a sorting system comprising a sorting section which has a conveying speed which can be variably controlled via a central controller, and is configured having a monitoring device for the sorting section, wherein the monitoring device is arranged upstream of the sorting section and detects incoming articles, and the monitoring device shares the result with the central controller and, e.g. depending upon the detected article, said controller regulates the conveying speed of the sorting section to such a speed that the respective article is transported at this speed as long as it is located on the sorting section.

In other words, the conveying speed stored in the central controller is used in order to control the conveying speed of the sorting section to such a conveying speed while the article is located thereon.

If the monitoring device is arranged upstream of the sorting section and detects incoming articles, and the monitoring device exchanges the result with the central controller and, depending upon the detected article, said controller uses a conveying speed stored in the central controller to control the conveying speed of the sorting section to such a conveying speed while the article is located thereon, the conveying speed can be set in a manner optimised for the article.

In an expedient manner, articles with a similar or the same stored conveying speed are introduced in a grouped manner onto the sorting section so that batches or trains of articles with a similar or the same speed classification are conveyed together on the sorting section in order to achieve speed advantages. Therefore, it is also possible to incorporate even the feed sections into the control of the conveying speed, which is advantageous for avoiding backlogs.

In order to determine the conveying speed, it is possible to use product properties of the articles, such as fragility, surface quality, friction coefficients, integrity and stability of the package and tipping stability. It is particularly preferred to use the tipping stability (cf. above).

The articles may be sorted into conveying speed groups upstream of the feed into the sorting section, for example, such as soon as articles are provided from a replenishment storage.

Significant throughput advantages can be achieved if more articles of one conveying speed group are provided from the replenishment storage than are required on average because these articles with possibly slower conveying speeds thus only have to be moved once or less often via the sorting section and therefore "block" or slow down the sorting section to a lesser extent. Further optimization over time can be achieved if more articles of one tipping stability group are provided e.g. at the same time from the replenishment storage than are required on average. In other words, more articles of one group than are required at a specific time are replenished at the same time in a grouped manner because such articles are required later, e.g. during the course of the day, and therefore grouping only needs to be carried out on one occasion. In order to buffer or intermediately store such "excess" articles, a separate intermediate storage or even a larger, already provided intermediate storage can be arranged at the exit of the sorting section.

When allocating feed sections, it may be taken into consideration that, where possible, articles of the same conveying speed groups are located on the same feed section. Still further, the same tipping stability groups may be located on the same feed section, where possible. In particular embodiments the sorting section is a shoe sorter or a shoe sorter with a central linear sorting section and with a plurality of feed sections and a plurality of discharge points. It is further possible to extend the control of the conveying speed of the sorting section also to the discharge points and the adjoining conveying sections so that no backlog is produced therein.

The sorting section itself can be controlled at the corresponding conveying speed relating to an article or a batch of articles until, in arithmetical terms, they must have left the sorting section overall. It is also feasible to provide sensor-supported monitoring (e.g. of the discharge points) in order to ascertain that all articles have actually left the sorting section in order to be able to adapt the conveying speed in an even more optimised manner in terms of time. The conveying speed can thus be changed earlier if e.g. all articles of a batch have already left the sorting section at the start through discharge points. It is also possible to divide the sorting section into individual sub-sections which can be regulated in terms of speed, so that they can be changed separately in terms of conveying speed even after the articles have left.

Embodiments of the invention may also be used in a materials handling system, such as e.g. a distribution centre or distribution warehouse etc., which is provided with a package buffer, with an automatic palletiser for loading a loading means with packages in a loading pattern based on an order including packages, with a controller which is programmed with a loading pattern generator in order to determine a loading pattern and generate commands for the automatic palletiser in order to place the packages onto the loading means according to the loading pattern, wherein the loading pattern which meets a specified minimum stability of the package or the group of packages is selected, and with a package transport means operatively connected to the controller for sequentially transporting the packages from the package buffer to the automatic palletiser for loading the loading means on the basis of the selected loading pattern.

The sorting system can be arranged between the replenishment storage and package buffer. In a preferred embodiment, the sorting system is then a linear sorter, such as e.g. a shoe sorter which is fed from the replenishment storage via a plurality of feeds and which feeds an intermediate storage, in particular a multiple-aisle and multiple-level rack storage having single-level rack serving apparatuses, via a plurality of discharge points. Then, it is possible in particular to "feed" (supply) the intermediate storage with more replenishment than necessary on average over time in order to optimise the sorting section allocation in terms of speed (see above). This applies in particular to articles which require a slow speed in terms of tipping stability, as these otherwise constantly slow down the entire system.

It can be expedient to group a plurality of feeds and allow them to enter into central feeds which in turn issue into the sorting section itself. A plurality of feeds can be used in the zip principle in order to introduce articles with similar conveying properties "together" from adjacent feeds.

The system can be used with packaged and unpackaged articles and also with articles in or on loading aids, such as trays or containers. When using trays, as the articles are being placed on the tray, the articles are preferably pre-positioned centrally or on the far side of the shoe grip so that the articles are less likely to tip over and, if they tip over on the tray, they do not fall off.

Further details of the invention will become clear from the following description of exemplified embodiments by reference to the drawings.

DESCRIPTION OF THE PREFERRED EMBODIMENTS

Figure 1:
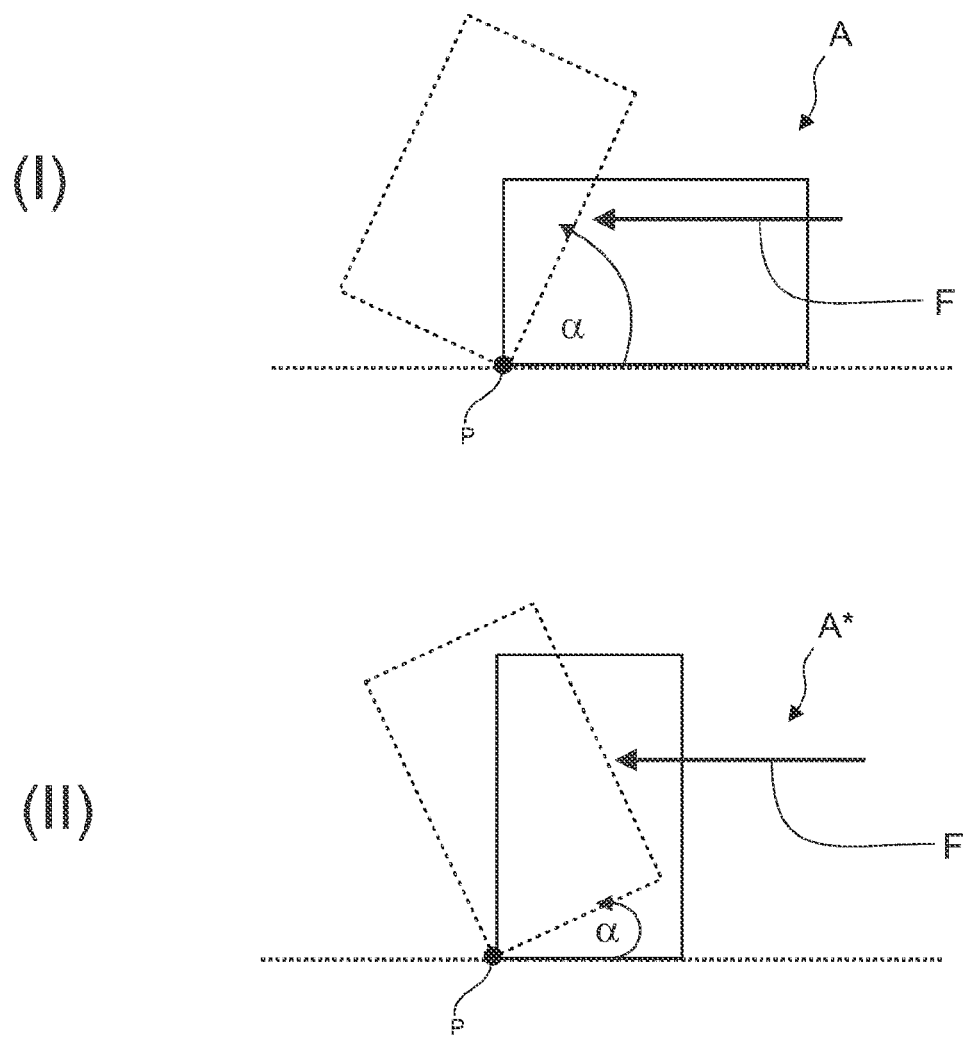
FIG. 1 shows an illustration of the determination of tipping stability over the tipping angle.

Firstly, the product property of tipping stability of the articles which is used is discussed by way of introduction and by way of example. For this purpose, an article A (example I) is firstly considered with reference to FIG. 1. This article is wider than it is tall and thus lies "flat" with a low centre of gravity on a conveyor (indicated by the dotted line F). In order to cause this article to tip over about a tipping point P, the article A must rotate about the tipping point P by a relatively large tipping angle $\alpha$ until the centre of gravity is displaced correspondingly far beyond the tipping point P.

In contrast, article A* in example (II) is taller than it is wide and has a higher centre of gravity when it lies on a conveyor (indicated by the dotted line F). In order to cause this article A* to tip over about the tipping point P, the article A* must rotate about the tipping point P by a relatively small tipping angle α (ca. 30-45 degrees). In order to displace the respective article to the corresponding tipping angle, a specific force F is required which is influenced, inter alia, substantially by the positive or negative acceleration and is related directly to the conveying speed.

It is apparent that the tipping angle is suitable for classifying the articles in terms of tipping stability and therefore conveying speed.

In the teach-in process, each EAN-coded article is similarly rotated about the corresponding tipping point P until it tips and the ascertained angle is assumed to be the tipping angle α. The tipping angle α ascertained in this way in the teach-in process is stored in a database which is accessed by the central control system. The grouping in terms of conveying speed is based upon the thus determined tipping angle α. The controller in the system described hereinafter is correspondingly set up to store such tipping stability values for each article or EAN-coded article in a database and to convert them into conveying speeds of the articles or to categorise the articles into groups on the basis thereof. Therefore, it can be expedient to form 3 to 5 conveying speed groups in order to simplify the control.

Figure 2:
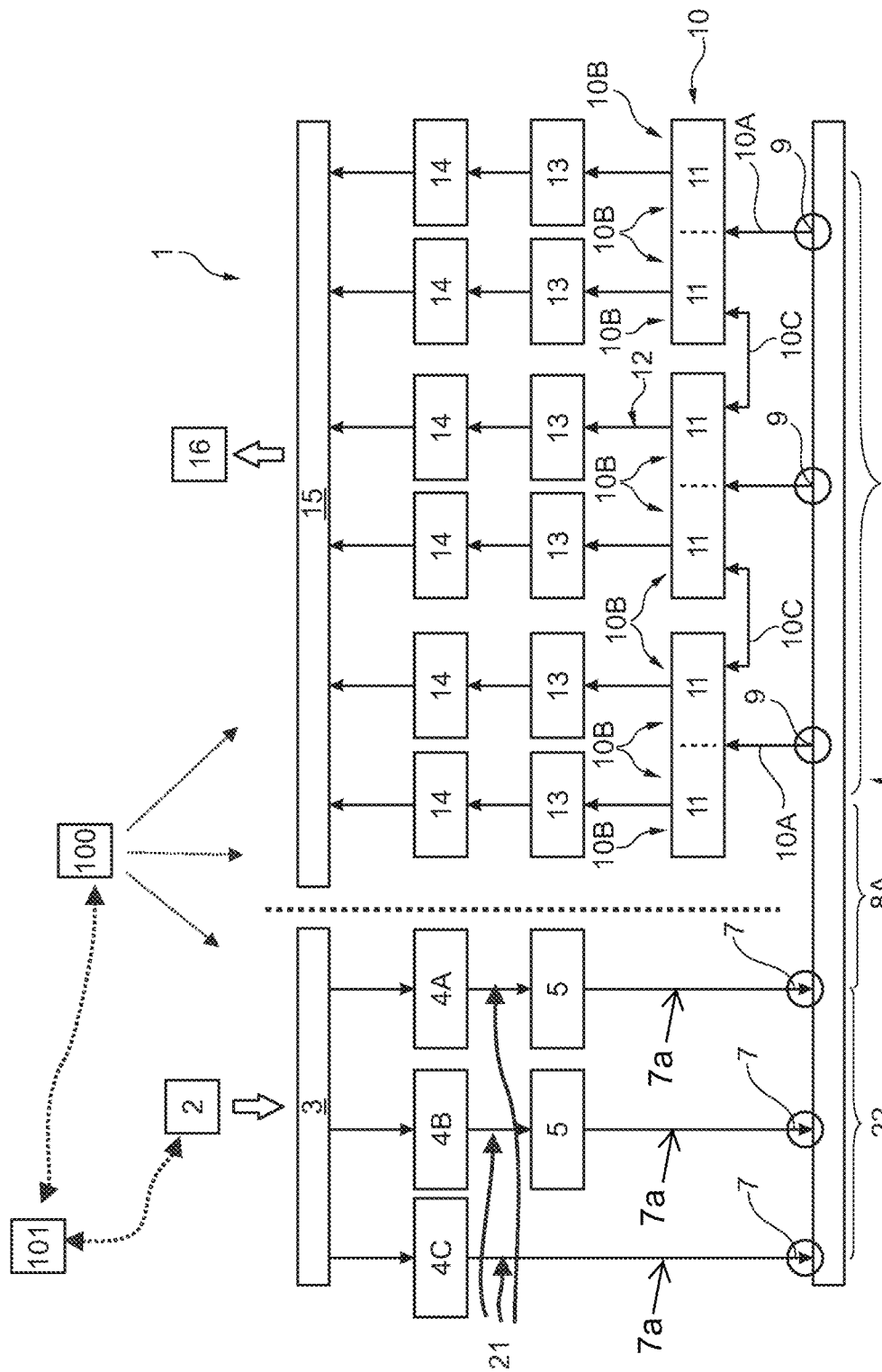
FIG. 2 shows a schematic block view of a sorting system in accordance with the invention in a replenishment storage.
Figure 3:
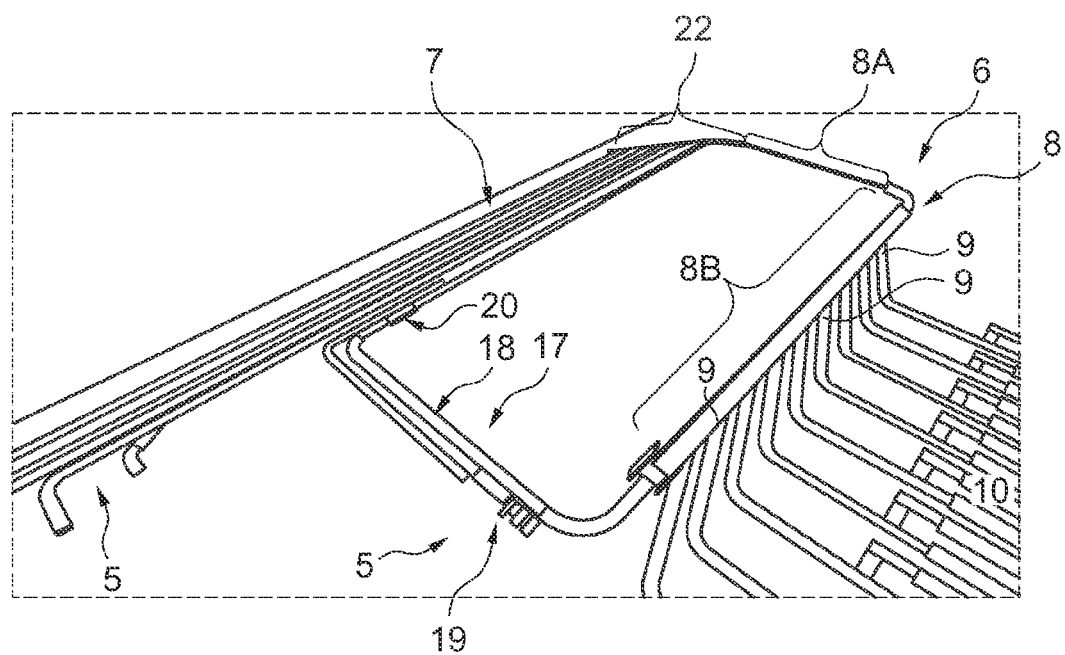
FIG. 3 shows a schematic perspective view of a detail of FIG. 2.

FIGS. 2 and 3 show a distribution center 1 with such a superordinate controller 100 which is fed with the conveying speed groups for each article or EAN-coded article and stores these values in a database and converts them into conveying speeds of the articles or divides the articles into groups on the basis thereof. The data are collected in a teach-in process 101, in which tipping stability values for the articles are determined manually in a repeatable manner using standardised specifications with technical support (cf. above). The system 1 is used for order fulfilment (for distribution) including automated stacking of mixed articles on a carrier (pallet or trolley) in a predetermined, calculated spatial arrangement in order to form a stack of mixed packages according to an order.

As illustrated, the system comprises a receiving unit 2 for receiving pallets with packages or articles for replenishment, a storage unit 3 for storing the received pallets, more than one depalletizing unit 4 for depalletizing packages or articles from the received pallets which come from the storage unit, and more than one tray unit 5 for loading singulated depalletized articles onto trays, wherein each tray carries an individual article. The system further includes at least one linear sorting unit 6 for receiving all trays from each tray unit having a main conveyor 8, a plurality of insertion points 7 from article feed sections 7a, including one from each tray unit 5, which lead into the main conveyor 8, and a plurality of discharge points 9 for discharging trays from the main conveyor 8 to a buffer storage 10. A buffer storage 10 for temporarily storing the trays drawn from the discharge points 9, which has at least two multi-storey storage racks which extend in the longitudinal direction and are separated laterally by an aisle 11. Also provided is more than one palletizer feed 12 which come from load lifting devices of at least one aisle 11 and each palletizer feed 12 has at least one tray-unloading unit 13 for unloading articles from a tray. The system also includes more than one palletizing unit 14 for stacking mixed articles on a support in a predetermined spatial arrangement in order to form a stack of mixed articles according to a distribution order, which is supplied with articles from at least one tray-unloading unit 13. Finished order pallets are conveyed to the pallet order sequence buffer 15 and then further to the pallet dispatch area 16.

In the incoming goods section of the receiving unit 2, the teach-in process takes place in order to determine the conveying speed group of the articles. The result is then stored in the database.

The storage unit 3 for storing the received pallets is a high-bay storage which is served via conveyors from the receiving unit and has automatic rack serving apparatuses which operate in the passageways in order to put pallets into storage and to remove pallets from storage on the basis of stock control instructions.

Removed pallets with required articles are conveyed to the depalletizing units provided for this purpose, where either the layers are removed from the pallets and the pallets are then singulated in a fully automated manner, or the pallets are manually depalletized with machine assistance and are placed individually onto a conveyor belt or directly onto a tray on the conveyor.

After the articles have been singulated, they can be verified in terms of identity (reading out of the EAN code) and orientation and optionally can be re-orientated by rotation and/or tipping apparatuses before they pass into the respective tray unit 5. This can be performed by at least one or more of the following groups A and/or B.

Group A can contain fully automatic depalletizing units 4A for pushing up and singulating articles from received pallets or automated manual (machine-assisted) depalletizing units 4B and singulation of articles from received pallets, and one or more tray units 5 for loading singulated depalletized articles onto trays, wherein each tray in this embodiment carries an individual article. Group B can contain one or more combined depalletizing and tray units 4C for manual, machine-assisted depalletizing of articles from received pallets and for individually loading singulated articles onto trays so that each tray carries only one single article (in this embodiment). It is also possible to place two or more articles onto a tray.

In the tray units 5, articles are thrown from an upper parallel and aligned conveyor onto trays onto a synchronized, parallel and aligned lower conveyor.

When using trays with two sizes, one such tray unit has two offset tray transport belts below the package conveyor which render it possible to place the package according to the size onto the respective tray. When using full-sized and half-sized trays, one conveyor is used for each tray size, as explained. By using trays in the following installation parts, it is possible to achieve a high level of throughput in a reliable manner. The trays used are constructed in two parts, which permits safe transport and simple removal. They consist of a frame and, within this frame, a movable base, as described in DE 10 2008 026 326 A1.

When transporting the articles to the tray units 5 (for loading the trays with articles) pre-grouping can even take place after recognition by means of the EAN codes read out in a first monitoring unit 21 and the conveying speed group ascertained from the database (see above). Therefore, articles of a similar conveying speed already land at the same tray units 5 and in the same induction lines or insertion points 7 after loading of the trays.

From the tray units 5, the trays loaded with an individual article are sent to accumulation insertion points 7 which serve to guide the trays onto the main conveyor 8 of the (linear) sorting unit 6. The insertion points 7 can be dedicated for each tray unit (or combined depalletizing and tray units) or can also be shared by pre-mixing lines which come from the tray units 5 (or combined depalletizing and tray units).

During removal or insertion of the articles at the insertion points 7 onto the sorting section or the gap-forming portion 8A located upstream, the articles are optionally finally grouped into groups having the same conveying speed group classification. Therefore, all of the articles in the gap-forming portion 8A have the same maximum conveying speed and can be accelerated in an optimum manner accordingly and are transported at the same maximum conveying speed into the discharging portion 8B where they are handled. The control system 100 knows, by reason of the above identification of the articles and pre-grouping, the sequence and position of the articles in the insertion points 7 and therefore can control the insertion accordingly such that the articles are inserted one behind the other from the different induction lines with the same speed classification so that they land one behind the other (in the batch) on the sorting section. To provide surety, a second monitoring unit can be provided in the feed 22 of the gap-forming portion 8A which synchronises and verifies the accepted data with read-out EAN codes and the database.

This batch of articles can thus be transported and discharged at optimum conveying speed for sorting purposes.

After insertion, the trays thus pass into a gap-forming portion 8A which is configured such that the gaps between the trays are standardised which improves the discharge in the discharging portion 8B. The discharge points 9 in the discharging portion 8B of the high-speed linear sorting unit are of the slat and shoe type, as described fundamentally in EP 0 484 150 A1. A return path 17 is arranged behind the discharge points 9 in order to enable the re-insertion of trays which have not been discharged by reason of excessive loading, errors etc. This return path 17 contains a conveyor 18 which leads back to the accumulation insertion points 7.

In order to control the transfer of trays to this portion, i.e. passing through the discharge points, a recognition unit for detecting incorrectly dimensioned articles (in particular height) is installed upstream of the discharge points in the tray unit. It is also possible to initially store such "faulty" trays in the buffer storage 10 and subsequently transfer them to a discharge unit 19, likewise contained in the return path 17, for handling articles which are discharged (e.g. by reason of a failed dimensional check) and require subsequent manual work or confirmation before being inserted. This discharge unit 19 is therefore also directly connected to the tray units 5 via a path and handles the articles discharged in the tray process. A further detection unit 20 is installed downstream of the discharge unit to verify the dimensions of reworked articles on trays before they re-enter the insertion points 7.

In the present case, all of the articles of a batch or a conveying speed group are conveyed beginning with the insertion from the insertion points 7 to the discharge point 9 and subsequent path to the buffer storage 10 at the conveying speed based upon tipping stability. As soon as the articles have left the path to the buffer storage 10, the control begins in a similar manner at a different conveying speed based upon tipping stability of the next articles or the following batch of articles.

The discharge points 9 supply paths which lead to the buffer storage 10. In particular, each path supplies entrance lifts 10A of the same aisle 11 in the buffer storage 10. Alternatively, the aisle 11 can also be served by a single entrance lift 10A. The conveyor for transporting the trays from the discharge points 9 to the load-picking up means is designed such that it connects each sorter removal area (path downstream of the discharge point) to the two entrance lifts 10A of each aisle. At the same time, it permits the rotation of large trays from the short edge guide to the long edge guide for space-saving storage.

If the conveyor for transporting trays to a specific aisle is overloaded, the warehouse management controller can divert trays to an alternative aisle 11 in order to introduce them e.g. into an adjacent warehouse aisle. If required, this tray can then be diverted to the destination aisle 11 by transporting it between the passageways, as indicated by the arrow 10C.

The buffer storage 10 comprises a plurality of multi-storey storage racks 10B which extend in the longitudinal direction and are separated laterally by an aisle 11. The buffer storage 10 has incoming and outgoing conveying connections at various levels and also at different levels for various functions. One level contains the incoming traffic to the entrance lifts 10A from the discharge points 9 of the sorting unit 6. One or two levels contain the outgoing, consolidated and sequenced traffic to the palletising units, depending upon the number of palletising units. On a further level, the outgoing traffic not associated with the palletising unit, i.e. the handling of empty tray stacks, is processed.

The rack storage consists of a plurality of multi-storey double-depth storage racks 10B which extend in the longitudinal direction and are separated by an aisle 11. In each level, guide rails for shuttles extend (as rack serving apparatuses) over the length of the aisle and past at least two entrance lifts 10A which each have a transport platform, which can be lifted and lowered, for lifting or lowering trays. In each case, an entrance lift 10A is integrated in each rack 10B. The guide rails are arranged in each of these levels such that the shuttles can completely access the storage racks and each entrance lift, in that the guide rails are arranged such that they extend along the aisle and past the entrance lifts. The shuttles are designed in such a manner that they transport the trays between the storage spaces in the storage racks and the entrance lifts 10A. In order to decouple this, alternating buffer conveyors are arranged on one side of each entrance lift 10A. The other side of each entrance lift 10A is connected to a conveyor for transporting trays to and from the entrance lifts.

Each aisle has four load-lifting apparatuses or lifts 10A. In each case, two are entrance lifts and two are exit lifts. The two entrance lifts are located on opposite sides of the aisle 11 and the two exit lifts are located on the same side of the aisle 11. This means that the conveyors which connect to the exit lifts on the same side of the aisle bypass the other exit lift and also the entrance lift. The conveyors are arranged on various levels of the storage racks 10B.

The shuttles are single-level shuttles and have a load-handling area which is served by load-handling apparatuses in the form of telescoping arms which can be extended to both sides of the aisle and comprise a plurality of fingers which can be moved between an engaging and non-engaging alignment in order to contact the tray(s) for pushing/pulling in each case. The telescoping arms have a working range which is twice as deep and larger.

The respective guide rails not only represent a running surface for the rack serving apparatuses, they can also be used to transfer energy (e.g. current transfer via current collectors) and/or the transfer of control and information signals (e.g. transfer via current collectors, wherein the signals are modulated to the current, see EP 2 591 559 A1).

The load-picking up means area of the shuttles is dimensioned such that it can pick up/carry one large full format tray or two small half-format trays. When two half-trays are being transported, the load-picking up means can move these two trays together, i.e. at the same time.

The design of the shuttle warehouse permits not only buffering but also order consolidation and sequencing. This means that all of the articles can be consolidated for a specific order and can be stored in specific passageways so that they can then be unloaded in a specified order to the palletiser in order to permit optimum stacking. The sequencing is achieved through the use of the shuttle lifts and storage-removal lifts in order to sort the order of the packages on the unloading line which leads into the palletizer feed(s) 12.

One or two aisles 11 are connected to each palletizing unit 14 by the palletizer feed 12 via the tray-unloading unit 13. The tray-unloading unit 13 also includes alignment and orientation portions to align and orient (rotate) the trays before the actual unloading takes place, which permits pre-orientation of the articles on the trays. For unloading itself (unloading the article from the tray) the unloader raises the loose base of the tray within the frame to a height of the edge and the article is pushed off laterally. The tray-unloading unit 13 also includes handling of empty trays. This includes the forming of stacks of empty trays and either the transfer thereof to the tray units or the storage in the buffer storage as described above.

Downstream of the removal unit(s), the unloaded articles are conveyed to the palletizer(s) from more than one palletising unit 14 in order to stack mixed articles on a base in a predetermined spatial arrangement so as to form a stack of mixed articles in accordance with an order. The palletizers 14 themselves are designed to be either fully automatic or manual and provide machine assistance for the manual procedure. Such fully automatic palletizers can be produced as described in WO 2014/005895 A1.

The order of the articles provided on the palletizer is specified on the basis of order information and preferences (shop layout etc.) and is calculated by a software module for the warehouse management system which is responsible for the virtual configuration of the final stack layout to be palletised on the basis of the articles in the respective order. The palletizers 14 contain a wrapping unit for securing the finished pallets for transport by wrapping them in stretch film. Finished pallets are moved by means of conveyors or by means of FTS to a dispatch and loading area 16 or alternatively are moved to a buffer area 15.

Figure 4:
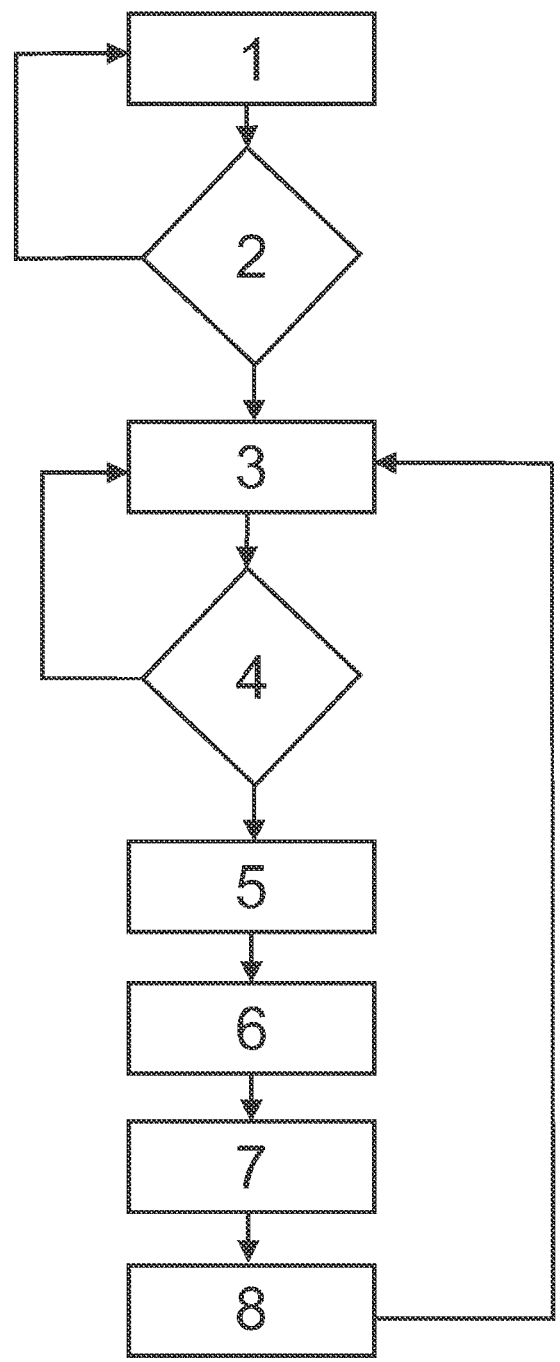
FIG. 4 shows a flow diagram of the operation.

As shown in FIG. 4, the sequence of the grouping of the articles in conveying speed groups and the control of the conveying speed of the conveyors in the system based thereon are described as below in steps:

1. When a new article is placed into storage or delivered for the first time, a teach-in process is carried out to determine the tipping stability using the tipping angle on an empirical basis. Should the article be already known, this can be omitted. The tilt stability value (angle, see above) determined in this manner is used to categorize the conveying speed group and this is stored in a retrievable manner for the respective database entry for the article.

2. If an article in the intermediate storage runs out and replenishment is then required, a replenishment order can be triggered in order to remove the required quantity of the corresponding article from the replenishment storage.

3. The conveying speed group of the articles to be replenished is taken into account.

4. If the article is an article in a slow conveying speed group because it tends to tip over, the quantity can be increased during replenishment in order to perform the replenishment less frequently.

5. The corresponding pallet is then removed from the high-bay storage and the calculated quantity of the article is depalletised and conveyed to the tray unit 5 and then the articles are introduced on the trays into the same insertion point 7. Therefore, articles with the same conveying speed grouping are grouped into the same insertion point.

7. Therefore, the trays can then be introduced into the sorting section one behind the other when it is their turn.

8. Therefore, during insertion from the insertion points 7 into the sorting section 8, the group of articles with the same conveying speed grouping are conveyed at the same conveying speed and during discharge from the discharge points 9 and on the paths to the buffer storage 10.

The method then begins anew.

The invention claimed is:

1. A sorting system comprising:
   a central controller;
   a sorting section with a variably controllable conveying speed;
   at least two feed sections that feed articles into the sorting section; and
   a monitor device in the at least two feed sections;
   wherein the monitor device is configured and connected to the central controller such that incoming articles are detected and with respect to the detected article a stored speed for controlling the conveying speed of the sorting section is interrogated by the central controller and used for the control thereof, and wherein the sorting section can be controlled in terms of conveying speed based upon one or more article properties that are stored with respect to the detected article.

2. The sorting system as claimed in claim 1, wherein the article properties comprise tipping stability.

3. The sorting system as claimed in claim 1, wherein the sorting section has a plurality of sorting portions which can be controlled independently of one another in terms of conveying speed.

4. The sorting system as claimed in claim 1, wherein the at least two feed sections are connected to a replenishment storage, from which the at least two feed sections are supplied in groups with articles of the same or similar conveying speed.

5. The sorting system as claimed in claim 2, wherein the article properties further comprise at least one of fragility, surface quality, friction coefficients, package integrity, and package stability.

6. A method for operating and controlling a sorting system comprising a sorting section that has a conveying speed that can be variably controlled via a central controller, said method comprising:
   detecting incoming articles using a monitor device for the sorting section, wherein the monitor device is arranged upstream of the sorting section and detects incoming articles;
   providing with the monitor device the results of said detecting to the central controller; and
   controlling the conveyor speed via the controller depending upon the detected article based on one or more article properties that are stored with respect to the detected article, wherein the controller uses a stored conveying speed that is stored in the central controller for controlling the conveying speed of the sorting section to the stored conveying speed while the article is located thereon.

7. The method as claimed in claim 6, wherein articles having a similar or the same stored conveying speed are introduced in a grouped manner onto the sorting section.

8. The method as claimed in claim 6, further comprising using product properties of the articles to determine the conveying speed.

9. The method as claimed in claim 8, wherein the product properties comprise at least one of fragility, surface quality, friction coefficients, package integrity, package stability, and tipping stability.

10. The method as claimed in claim 6, further comprising sorting articles into conveying speed groups upstream of the feed into the sorting section.

11. The method as claimed in claim 6, further comprising providing articles from a replenishment store based on conveying speed groups.

12. The method as claimed in claim 11, further comprising simultaneously providing more articles of one conveying speed group from the replenishment storage than are required on average.

13. The method as claimed in claim 6, further comprising locating articles of the same conveying speed groups on the same feed section.

14. The method as claimed in claim 6, further comprising pre-positioning an article centrally or on a far side of a sorter grip when the article is placed on a tray so that the article is less likely to tip over or fall off the tray.

\* \* \* \* \*